Patented Aug. 15, 1950

2,518,579

UNITED STATES PATENT OFFICE 2,518,579

CURING OF CHLOROPRENE POLYMERS

Maynard F. Torrence, Woodstown, N. J., assignor to E. I. du Pont de Nemours & Company, Wilmington, Del., a corporation of Delaware No Drawing. Application April 2, 1948, Serial No. 18,722

2 Claims. (Cl. 260—79.5)

This invention relates to the curing of chloroprene polymers. The invention has for its object to increase the speed of curing polychloroprene and to provide a process for curing polychloroprene which gives a cured elastomer having improved modulus of elasticity and resilience and which is improved in heat build-up, permanent set and related properties.

Although the curing of polychloroprene (2-chlorobutadiene-1,3) elastomers has been developed to a stage which is generally satisfactory for most purposes, it has been found desirable and attempts have been made to further increase the speed of curing this polymer and to improve, if possible, the properties of the resulting cured polychloroprene. It is commonly known that sulfur, which is the outstanding vulcanizing agent for natural rubber, has only a mild auxiliary action in the curing of polychloroprene, while zinc oxide and magnesium oxide, which are powerful curing agents for polychloroprene, do not operate as vulcanizing agents for natural rubber so that, in general, the vulcanizing agents for natural rubber are not the same as those generally used in the curing of polychloroprene. The diortho-tolyl guanidine salt of dicatechol borate, which is used in comparisons in examples hereinafter given, is a very worthwhile accelerator in the curing of polychloroprene although it was developed as an anti-oxidant for rubber, and tetramethyl thiuram disulfide, which is a powerful vulcanization accelerator for rubber, exerts an opposite effect in polychloroprene and keeps it in a plastic condition.

I have now found that the curing of polychloroprene can be materially accelerated when there is added to the polychloroprene from 0.1% to 5% of a sulfide of antimony, and that the resulting cured elastomer has improved properties such as modulus of elasticity, resilience, lower heat build-up, and less permanent set. The antimony sulfides may be used alone or, preferably, in combination with other substances which are known to have a favorable effect on the curing of polychloroprene, such as zinc oxide, magnesium oxide, and other metal oxides. In general, the use of from 1% to 10% of zinc oxide and from 1% to 10% of magnesium oxide in combination with the sulfides above mentioned is preferred. These sulfides may also be used with other polychloroprene compounding ingredients such as reinforcing agents (carbon black), fillers (clay), softening agents (mineral oils), anti-oxidants, chemical plasticizers, and anti-scorching agents (such as sodium acetate). These sulfides may be used in the curing of any of the plastic polymers of chloroprene such as those made, for example, by the process of U. S. Patents 1,950,436, 2,227,517 and 2,234,215.

The following examples are given to more fully illustrate the invention. The parts used are by weight unless otherwise specified.

EXAMPLE 1

A batch of stock having the following composition was mixed on a 30 inch rubber mill:

| | Parts |
|---|---|
| Polychloroprene | 100 |
| Sodium acetate | 1 |
| Stearic acid | 1 |
| Petrolatum | 2 |
| Extra light calcined magnesia | 4 |
| Easy processing channel carbon black | 29.3 |
| Light process oil | 5 |
| Zinc oxide | 5 |
| Total | 147.3 |

To 147.3 parts by weight of this stock (containing 100 parts of polychloroprene), 0.5 part of the various sulfides listed in Table I were added on a 10 inch mill. After incorporation of the sulfides, the stocks were sheeted into slabs 0.100 inch thick and cured in a mold under pressure between steam heated platens at the temperatures indicated. At the end of the indicated time, the slabs were cooled in water and allowed to rest 24 hours. Standard one-quarter inch dumbell test pieces were prepared and tested according to ASTM specification. Heat build-up samples, 1 inch high and 0.75 inch in diameter were cured in a suitable mold between steam heated platens. The cured pellets were tested on the Goodrich Flexometer under a constant load, using a $\frac{1}{16}$ inch stroke, 1800 times per minute on the upper platen. The temperature of the pellet at the point of contact to the lower (hard rubber) platen was obtained constantly by means of a thermocouple. The rise in temperature at the end of 20 minutes' flexing was recorded.

It will be seen by comparing the properties shown in Table I for cured stocks obtained with and without the sulfides of the present invention that these sulfides greatly increased the modulus and decreased the heat build-up to an important extent. It will also be noted that the modulus, and heat build-up obtained with only a 45 minute cure in the presence of the sulfides were substantially the same as those for which a 90 minute cure was required in the absence of sulfides. The four differently colored physical forms of $Sb_2S_3$, as well as $Sb_2S_5$, with and without additional sulfur all behaved similarly.

Among other sulfides similarly tested, those of nickel, zinc and aluminum had little effect on cure, and cadmium sulfide retarded. On the other hand, bismuth sulfide and sodium sulfide ($Na_2S$) had strong curing actions like those of the sulfides in Table I.

Table I

| | Stress at 400% Elongation | | Tensile at Break | | Heat Build-up | |
|---|---|---|---|---|---|---|
| Time of Cure (Minutes) at 281° F | 45 | 90 | 45 | 90 | 45 | 90 |
| Sulfide Added | | | | | °C. | °C. |
| None | 1,825 | 2,275 | 3,475 | 3,475 | 82 | 60 |
| Antimony Pentasulfide ($Sb_2S_5$) | 2,350 | 2,800 | 3,425 | 3,150 | 56 | 48 |
| Golden Antimony Pentasulfide ($Sb_2S_5$+15% Free Sulfur) | 2,325 | 2,850 | 3,475 | 3,100 | 56 | 50 |
| Black Precipitated Antimony Trisulfide ($Sb_2S_3$) | 2,300 | 2,650 | 3,275 | 3,075 | 55 | 48 |
| Crimson Antimony Trisulfide ($Sb_2S_3$) | 2,250 | 2,700 | 3,275 | 3,175 | 56 | 48 |
| Golden Antimony Trisulfide ($Sb_2S_3$) | 2,275 | 2,775 | 3,400 | 3,225 | 53 | 51 |
| Red Antimony Trisulfide ($Sb_2S_3$) | 2,350 | 2,700 | 3,300 | 3,050 | 53 | 49 |

Example 2

Using the procedure described in Example 1, 0.5 part of antimony trisulfide was compared to 1.0 part of diorthotolyl guanidine salt of dicatechol borate (a commonly used accelerator for polychloroprene) in compounds of the following composition:

Table II

| Stock Nos. 1240N— | 63 | 64 |
|---|---|---|
| Polychloroprene | 100 | 100 |
| Sodium Acetate | 1 | 1 |
| Stearic Acid | 1 | 1 |
| Extra Light Calcined Magnesia | 4 | 4 |
| Light Process Oil | 3 | 3 |
| Diorthotolyl guanidine Salt of Dicatechol Borate | 1 | |
| Antimony Sulfide | | 0.5 |
| Zinc Oxide | 5 | 5 |

MINUTES CURED AT 281° F.

| | | | |
|---|---|---|---|
| Stress at 300% Elong | 30 | 200 | 225 |
| | 45 | 250 | 225 |
| | 60 | 300 | 225 |
| | 180 | 350 | 300 |
| Stress at 700% Elong | 30 | 1,100 | 1,325 |
| | 45 | 1,550 | 1,600 |
| | 60 | 1,700 | 1,875 |
| | 180 | 2,400 | |
| Tensile at Break | 30 | 2,800 | 3,375 |
| | 45 | 3,000 | 3,250 |
| | 60 | 2,875 | 2,825 |
| | 180 | 2,400 | 1,850 |
| Heat Build-Up | 60 | 52° C. | 42° C. |
| | 90 | 45° C. | 35° C. |

It will be noted that the antimony sulfide gave lower modulus at low elongation and higher modulus at high elongation with the average close to the same. The heat build-up was much lower.

Example 3

The effect of the sulfides on permanent set, resiliency and heat build-up is illustrated by the following data obtained by comparing antimony trisulfide and the diorthotolyl guanidine salt of dicatechol borate in a control stock of the following composition:

Table III

| | Parts |
|---|---|
| Polychloroprene | 100 |
| Sodium acetate | 1 |
| Stearic acid | 1 |
| Extra light calcined magnesia | 4 |
| Easy processing channel carbon black | 31 |
| Light process oil | 3 |
| Zinc oxide | 5 |

| | Compression Set—ASTM Method A | | Yerzley Resiliency | | Heat Build-Up Goodrich | |
|---|---|---|---|---|---|---|
| Time of Cure (Minutes) at 281° F | 45 | 90 | 45 | 90 | 45 | 90 |
| Agent Added | Percent | Percent | Percent | Percent | °C. | °C. |
| None | 14.7 | 8.0 | 76.3 | 76.7 | 82 | 59 |
| $Sb_2S_3$: | | | | | | |
| 0.125 part | 13.6 | 6.5 | 77.3 | 77.1 | 71 | 57 |
| 0.25 part | 12.2 | 6.0 | 77.7 | 79.2 | 63 | 55 |
| 0.5 part | 9.6 | 5.9 | 78.9 | 80.1 | 56 | 53 |
| Diorthotolyl guanidine Salt of Dicatechol Borate, 0.5 part | 14.0 | 7.5 | 76.8 | 79.6 | 66 | 58 |

EXAMPLE 4

Red antimony trisulfide $Sb_2S_3$ was added in the amounts shown in the following table to polychloroprene on a standard 10 inch laboratory mill. After incorporation of the antimony sulfide the stocks were sheeted into slabs 0.100 inch thick and cured in a mold under pressure between steam heated platens at the temperatures indicated. At the end of the indicated time the slabs were cooled in water and allowed to rest 24 hours. Standard ¼ inch dumbbell test pieces were prepared and tested according to ASTM specification. The results of these tests are tabulated in Table IV. It will be noted that maximum modulus, irrespective of the length of cure, is increased as the amount of antimony sulfide is increased, and the time required to reach it is decreased.

Table IV

| Stock Nos. 1227N— | 995 | 996 | 997 | 998 | 999 |
|---|---|---|---|---|---|
| | Parts by Weight | | | | |
| Polychloroprene | 100 | 100 | 100 | 100 | 100 |
| Antimony Sulfide | 0 | 0.25 | 0.5 | 1 | 2 | 4 |
| Physical Properties | | | | | |
| Modulus at 400%, p. s. i.: Cure: | | | | | |
| 45 min./227° F | | | | | 125 | 150 |
| 45 min./281° F | | | | | 350 | 450 |
| 60 min./281° F | 75 | 125 | 150 | 250 | 350 | 425 |
| 120 min/281° F | 100 | 125 | 150 | 250 | 350 | 450 |
| | | 150 | 200 | 275 | 350 | 450 |
| Tensile Strength at Break, p. s. i.: | | | | | |
| 45 min./227° F | | | | | 1,700 | 2,050 |
| 45 min./281° F | 1,275 | 1,650 | 1,500 | 2,325 | 1,250 | 1,150 |
| 60 min./281° F | 1,450 | 1,725 | 1,650 | 1,275 | 1,300 | 1,050 |
| 120 min./281° F | | 1,950 | 950 | 850 | 850 | 900 |
| Elongation at Break, Per Cent: | | | | | |
| 45 min./227° F | | | | | 1,110 | 1,140 |
| 45 min./281° F | 1,055 | 860 | 790 | 860 | 675 | 630 |
| 60 min./281° | 915 | 820 | 760 | 680 | 650 | 620 |
| 120 min./281° F | | 820 | 640 | 600 | 565 | 540 |
| Hardness, Shore A Durometer: | | | | | |
| 45 min./227° F | | | | | 34 | 34 |
| 45 min./281° F | 30 | 36 | 36 | 36 | 39 | 39 |
| 60 min./281° F | 32 | 37 | 37 | 39 | 39 | 39 |
| 120 min./281° F | | 37 | 39 | 39 | 40 | 42 |

Although in the specific examples only two temperatures of vulcanization were employed to illustrate the invention, the invention is applicable to any of the temperatures normally used in the vulcanization of polychloroprene stocks.

I claim:
1. A process for effecting rapid curing of chloroprene polymers which comprises incorporating in the polymer from 0.1% to 5%, based on the weight of the polymer, of an antimony sulfide, and heating to effect vulcanization.

2. A process for effecting rapid curing of chloroprene polymers which comprises incorporating in the polymer from 1% to 10%, based on the weight of the polymer, of each of magnesium oxide and zinc oxide, and from 0.1% to 5%, based on the weight of the polymer, of an antimony sulfide, and heating to effect vulcanization.

MAYNARD F. TORRENCE.

REFERENCES CITED

The following references are of record in the file of this patent:

UNITED STATES PATENTS

| Number | Name | Date |
|---|---|---|
| 2,012,223 | Cutler | Aug. 20, 1935 |
| 2,165,818 | Scholl | July 11, 1939 |